Patented Apr. 16, 1935

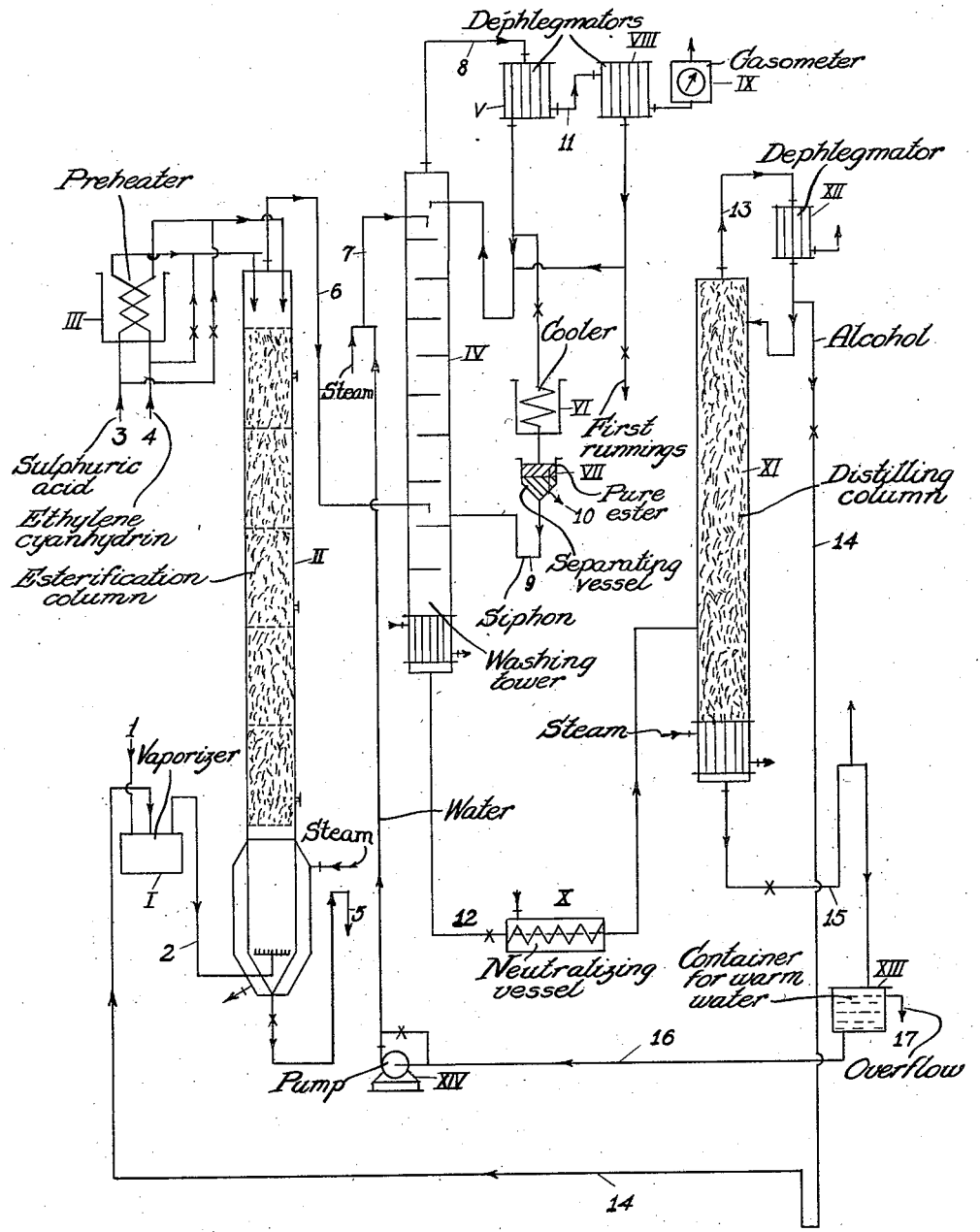

1,998,413

UNITED STATES PATENT OFFICE 1,998,413

PROCESS OF PRODUCING UNSATURATED ESTERS

Walter Reppe and Ulrich Hoffmann, Ludwigshafen-on-the-Rhine, Germany, assignors to I. G. Farbenindustrie Aktiengesellschaft, Frankfort-on-the-Main, Germany Application March 3, 1934, Serial No. 713,810
In Germany January 30, 1932

13 Claims. (Cl. 260—106)

The present invention relates to a process of producing pure unsaturated esters.

In the industrial manufacture and production of acrylic esters, as for example by the reaction of ethylene cyanhydrin with alcohols in the presence of sulphuric acid, the recovery of the esters in a state of high purity in which they are readily polymerizable, offers considerable difficulty because the mixture consisting of acrylic ester, alcohol, water and free acrylic acid obtained cannot be separated in a simple manner, as for example by distillation. In order to secure an esterification as complete as possible and to avoid the occurrence of large amounts of free acrylic acid in the reaction product, it is necessary to employ a large excess of alcohol (about three times the amount necessary theoretically) during the esterification. This, however, aggravates the difficulty of obtaining the ester in a pure state because alcohol and acrylic ester form binary mixtures which cannot be separated by distillation.

We have found that pure esters of low boiling point, i. e. boiling below about 200° C., of aliphatic acids containing at least one olefinic double bond may be obtained in a very advantageous manner from mixtures containing the said esters, the corresponding alcohols and acids, and water and, in some cases difficultly volatile inorganic acids such as sulphuric acid or phosphoric acid, by heating the said mixture to vaporize at least the said esters and washing the vapors with water, preferably with amounts of water which are from 1 to 25 times the weight of the esters.

Mixtures of the said kind are formed for example by the production of ester from compounds capable of reacting as unsaturated aliphatic acids, namely of aliphatic unsaturated acids themselves or of suitable cyano compounds, and it is especially advantageous to effect the separation treatment directly after such a process in which esters are obtained in admixture with the corresponding acid, alcohol and water. The production of acrylic esters from ethylene cyanhydrin may be mentioned by way of example. Not only the unsaturated acid and the alcohol, but also sulphuric acid or like inorganic acids if such have been employed in the preparation of the esters and are therefore present in the reaction mixture, are separated from the resulting esters according to the present invention. The esters are obtained in a pure form highly suitable for further working up or conversion according to any desired process. It is of special advantage that the esters thus obtained are not only free from foreign substances but also from undesirable conversion products such as polymerization products or products of an interaction of water with the said esters although the said compounds are liable to polymerize and to add water, especially in the heat.

The reaction is preferably carried out by introducing a vaporized mixture containing the ester to be obtained into the lower part of heat column and supplying hot water to the upper part of the said column. It is preferable to use from 1 to 25 parts of water per each part of ester. A vaporous mixture of steam and ester which usually has a temperature not above 100° C., is withdrawn at the upper part of the heating zone while an aqueous solution containing the acid which has escaped esterification and the alcohol (and sulphuric acid, if such is present) is withdrawn at the lower part of the heating zone. The vaporous mixture of ester and steam is condensed whereby two layers are formed. One of the said layers consists of the pure ester which, if desired, after drying may be employed for any purpose. The condensed water which is free from oxygen is preferably again used for washing. It is advantageous to prevent the access of free oxygen and gases containing the same such as air to the materials under treatment.

As esters of unsaturated fatty acids which may be recovered in a pure form according to this invention may be mentioned for example methyl, propyl, butyl, allyl, ethylene glycol and monoethyl glycol esters of acrylic or crotonic acid and the methyl, ethyl, allyl and butyl esters of angelic, tiglic and methylacrylic acids.

The process may be carried out for example by leading the vapor mixture consisting for example of acrylic methyl ester, methanol, water and acrylic acid obtained by the esterification into the lower part of a copper fractionating column through which hot water is caused to trickle from the top. The temperature of the fractionating column, which may be varied to a great extent by the washing water and the heating means of the column, and the amount of water are so adjusted that a mixture of acrylic methyl ester and water distils off while an aqueous solution of methanol and free acrylic acid flows away from the column. The mixture of acrylic methyl ester and water distilling off at the top of the column is condensed whereby it separates into two layers. The lower aqueous layer is returned to the upper part of the column, while the lower layer, which consists of from 97 to 98 per cent acrylic acid ester and is entirely free from acrylic acid, is withdrawn. Any constituents which are gaseous or of low boiling point formed during the esterification, as for example ethers, may be separated from the ester by fractional condensation. Other unsaturated esters, as for example acrylic ethyl ester, crotonic methyl ester and crotonic ethyl ester, may be separated in the same manner provided the binary mixture of ester and water has a lower boiling point than the mixture of alcohol and water.

The unsaturated esters may be continuously prepared in the following manner described by way of example. Ethylene cyanhydrin is caused to react in a heated column with methanol and sulphuric acid with the formation of acrylic methyl ester. A vaporous mixture of acrylic methyl ester, methanol and water with a little acrylic acid escapes at the top of the column, while a mixture of ammonium bisulphate and the excess of sulphuric acid is continuously withdrawn from the bottom. The vapor mixture leaving the top of the column is led into the bottom of a second heated column through which water is trickling. A binary mixture of acrylic methyl ester and water is withdrawn from the top of the second column and an about 98 per cent acrylic methyl ester is recovered therefrom, while an about 10 per cent aqueous methanol solution is withdrawn from the bottom of the column and led into a third heated column in which the methanol is recovered; this methanol may be used again for esterification in the first column.

Special columns provided with filler bodies, bell plates, sieve plates or plates are suitable for the separation of the esters. Columns of any construction may be employed provided they render possible the washing of the crude vaporous esters with water. The columns may be operated continuously or periodically.

Suitable constructional materials for the columns and their associate parts are for example iron, aluminium and materials lined with zinc, tin or lead. In many cases copper and materials lined with copper are especially advantageous because small amounts of dissolved copper have a polymerization-preventing action.

The following examples are given with reference to the accompanying drawing which is a diagrammatic section of an apparatus suitable for carrying out the invention. These examples will further illustrate the nature of this invention but the invention is restricted neither to these examples nor to the particular arrangement shown. The parts are by weight.

*Example 1*

In the accompanying drawing I represents a vaporizer, II an esterification column, III a preheater, IV a washing tower, V, VIII and XII three dephlegmators, VI a cooler, VII a separating vessel, IX a gasometer, X a neutralizing vessel, XI a distilling column, XIII a container and XIV a pump. The numbers 1 to 8 and 10 to 16 represent pipes, 9 a siphon and 17 an overflow.

The process is carried out in the apparatus shown in the following manner.

4.70 parts of methanol per hour are introduced through a pipe 1 into a vaporizer I from which the vapors pass through a pipe 2 into the lower part of the body of the still of the esterification column II. The column II is filled with clay rings and contains several separating plates; the body of the still is kept at about 150° C. (internal temperature). 7.2 parts of 85 per cent sulphuric acid and 4 parts of 87.6 per cent ethylene cyanhydrin per hour are led through pipes 3 and 4 respectively to a preheater III in which they are preheated to a temperature of 140° C. and they then enter the upper part of the esterification column II. They mix with each other in the column and react with the evolution of heat to form acrylic acid and ammonium bisulphate. While flowing down, the mixture encounters the vapors of methanol and water, the acrylic acid reacting with the methanol to form acrylic methyl ester; the ester leaves the top of the column together with methanol, small amounts of acrylic acid and amounts of water which vary according to the temperature. The ammonium bisulphate and the excess of sulphuric acid collect in the body of the still. A fraction of free acrylic acid still present in this mixture is esterified by the vaporous methanol entering through the pipe 2 and is carried upwards thereby. The mixture of ammonium bisulphate and sulphuric acid, which while in the still is kept at a temperature above its melting point (about 120° C.) by heating, is continuously withdrawn through a pipe 5. The esterification column is preferably first heated to 100° C. by means of direct steam and then kept at from about 125° to 130° C. by the heat of reaction. The temperature may be regulated to a great extent by the concentration of the initial materials and the degree of preheating of the sulphuric acid and ethylene cyanhydrin in the preheater III, if necessary while making use of the by-passes of the pipes 3 and 4. In the case of heavy loads, the preheater III may be completely cut out.

The vaporous mixture leaving the esterification column II through a pipe 6 consists on an average of 46 per cent of ester, 38 per cent of methanol, 14 per cent of water, 1 per cent of acrylic acid and small amounts of dimethyl ether and acetaldehyde. It passes to a washing column IV constructed for example of copper and provided with 40 bell plates which it enters for example at about the fifth plate from the bottom and flows upwards, while at about the fifth plate from the top hot water flows downwards: the water enters through a pipe 7 in an amount of 40 parts per hour at a temperature of 80° C. The methanol is washed out from the ascending vapors by the water which flows into the body of the still which is kept at 96° C. by indirect steam heating. The binary mixture of water and acrylic methyl ester having a boiling point of 71° C. leaves the washing column through a pipe 8, passes through a dephlegmator V kept at 60° C., is condensed and flows through a cooler VI into a separating vessel VII. In this vessel it separates into two layers, the lower aqueous layer flowing back continuously into the washing column through a siphon 9 while the upper layer which consists of acrylic methyl ester in a purity of 98 per cent and free from acrylic acid, acetaldehyde and dimethyl ether is continuously withdrawn through a pipe 10. The amount of acrylic acid ester obtained per hour amounts to about 85 per cent of the theoretical amount. The gaseous constituents (acetaldehyde and dimethyl ether) leaving the dephlegmator V pass through a pipe 11 into a second dephlegmator VIII wherein they are freed from small amounts of ester and water which may have been carried along with them and then leave the apparatus through a gasometer IX.

The aqueous solution of methanol which still contains small amounts of free acrylic acid but is quite free from acrylic methyl ester leaves the body of the still of the column IV through a pipe 12, passes through a vessel X in which it is continuously neutralized with caustic soda solution and flows into the column XI which is filled with rings. The methanol is therein distilled off in the usual manner and leaves the column through a pipe 13 after which it passes through a dephlegmator XII and is returned in the liquid state through a pipe 14 to the methanol vaporizer I.

The body of the still of the column XI is heated for example by means of indirect steam. Water containing small amounts of acrylic and polyacrylic acid sodium salts passes from this column through a pipe 15 into a container XIII from which it is pumped by means of a pump XIV through a pipe 16 and passes again into the washing column IV through the pipe 7. The small amount of excess water which is being continually added to the circulating water through the pipe 6 from the esterification column II leaves the continuous cycle of water through an overflow 17 in the container XIII.

The ethylene cyanhydrin employed for the reaction need not be in a distilled, anhydrous form but may contain small amounts of the initial materials used in its preparation, as for example ethylene oxide and hydrocyanic acid, and also higher boiling or inorganic constituents. By means of the said apparatus it is possible to obtain acrylic methyl ester continuously in very good yields.

The bodies of the stills of the columns in which the distillation of the ester and the washing out with water are carried out may also be heated by means of direct steam. In this case it is advantageous to avoid the presence of air or oxygen in the steam. The amount of heat required for the production of the steam may be kept low by heat exchange.

Instead of acrylic methyl ester other esters of unsaturated aliphatic acid such as crotonic butyl ester may be obtained in an analogous manner.

Example 2

A mixture of about 4 per cent of acrylic acid, 51 per cent of ethyl alcohol, 27 per cent of acrylic ethyl ester, 17 per cent of water and 1 per cent of sulphuric acid obtained by the esterification of 1 part of 72 per cent acrylic acid with 2 parts of 96 per cent ethyl alcohol while adding 1 per cent of sulphuric acid as a catalyst is continuously introduced in the liquid state into the copper washing column IV and is continuously distilled while trickling it with 10 parts of condensed water at 80° C. An aqueous solution of ethanol, acrylic acid and sulphuric acid may be withdrawn from the heated body of the still at the lower end of the washing column IV, while the azeotropic mixture of about 90 parts of acrylic ethyl ester and 10 parts of water distils off through the pipe 8. The distillate is condensed in the dephlegmator V, and the condensate flows through the cooler VI and passes into the separating vessel VII. The lower aqueous layer enters the washing column IV at a suitable point while the upper water-insoluble layer (acrylic ethyl ester) is withdrawn and, if desired, dehydrated, as for example by freezing, drying with calcium chloride or distillation. The ester is obtained in a practically quantitative yield in this manner.

Instead of acrylic ethyl ester other esters of the kind defined, for example the allyl ester of crotonic acid may be obtained in a pure form in an analogous manner.

What we claim is:—

1. The process of producing pure esters of low boiling point of aliphatic acids containing at least one olefinic double bond from a mixture comprising such an ester, which comprises heating the said mixture to vaporize at least the said ester and refluxing part of the vaporized material by washing the vapors evolved with water.

2. The process of producing pure esters boiling below about 200° C. of aliphatic acids containing at least one olefinic double bond from a mixture comprising such an ester, the corresponding acid, the corresponding alcohol and water, which comprises heating the said mixture to vaporize at least the said ester and refluxing part of the vaporized material by washing the vapors evolved with water.

3. The process of producing pure esters of low boiling point which comprises the steps of producing the ester from a compound capable of reacting as an aliphatic acid containing at least one olefinic double bond by means of an excess of an alcohol to form a mixture comprising a low boiling ester of an aliphatic acid containing at least one olefinic double bond, the corresponding acid, the corresponding alcohol and water, heating the said mixture to vaporize at least said ester and refluxing part of the vaporized material by washing the vapors evolved with water.

4. The process of producing pure acrylic esters, boiling below 200° C., which comprises treating ethylene cyanhydrin with an alcohol in the presence of sulphuric acid to form a mixture of acrylic ester, acrylic acid, alcohol and water, heating the said mixture to vaporize at least the said ester and refluxing part of the vaporized material by washing the vapors with water.

5. The process of producing pure esters boiling below about 200° C. of aliphatic acids containing at least one olefinic double bond from a mixture comprising such an ester, which comprises heating the said mixture to vaporize at least the said ester, and refluxing part of the vaporized material by washing the vapors with water while excluding gases containing free oxygen during the said treatment.

6. The process of producing pure esters boiling below about 200° C. of aliphatic acids containing at least one olefinic double bond from a mixture comprising such an ester, the corresponding acid, the corresponding alcohol and water, which comprises heating the said mixture to vaporize at least the said ester, washing the vapors with water to separate a vaporous mixture consisting of the said ester and water from a liquid mixture of the said acid, the said alcohol and water thus refluxing part of the vaporized material, while excluding gases containing free oxygen during the said treatment.

7. The process of producing pure esters boiling below about 200° C. of aliphatic acids containing at least one olefinic double bond from a mixture comprising such an ester, the corresponding acid the corresponding alcohol and water, which comprises providing a heated zone, continuously supplying the said mixture to the lower part of the said zone, evaporating in the said distillation zone at least the said ester, continuously supplying from 1 to 25 times the weight of the said ester of water to the upper part of the said zone, continuously withdrawing at the upper part a vaporous mixture consisting of the said ester and water and continuously withdrawing at a lower point a mixture comprising the said alcohol, the said acid and water, gases comprising free oxygen being excluded during the said treatment.

8. The process of producing a pure alkyl ester of acrylic acid from a mixture comprising the said ester, the corresponding alcohol, acrylic acid and water, which comprises heating the said mixture sufficiently to evaporate the said ester, washing the vapors evolved with from 1 to 25 times the weight of the said ester of water and excluding gases containing free oxygen during the said treatment.

9. The process of producing pure acrylic methyl ester from a mixture comprising the said ester, methyl alcohol, acrylic acid and water, which comprises heating the said mixture to evaporate at least the said ester, washing the vapors evolved with from 1 to 25 times the weight of the said ester of water thus refluxing part of the vaporized material and excluding gases containing free oxygen during the said treatment, the whole process being performed in a continuous manner.

10. The process of producing pure acrylic ethyl ester from a mixture comprising the said ester, ethyl alcohol, acrylic acid and water, which comprises heating the said mixture sufficiently to evaporate at least the said ester, washing the vapors evolved with from 1 to 25 times the weight of the said ester of water thus refluxing part of the vaporized material and excluding gases containing free oxygen during the said treatment, the whole treatment being performed in a continuous manner.

11. The process of producing a pure alkyl ester of acrylic acid boiling up to about 200° C. from a mixture comprising the said ester, the corresponding alcohol, acrylic acid and water, which comprises providing a hot zone, continuously supplying the said mixture to the lower part of the said zone, continuously supplying from 1 to 25 times the weight of the said ester of water to the upper part of the said zone, continuously withdrawing at the upper part a vaporous mixture consisting of the said ester and water and continuously withdrawing at a lower point a liquid mixture comprising the said alcohol, the said acid and water, gases containing free oxygen being excluded during the said treatment.

12. The process of producing pure acrylic methyl ester from a mixture comprising the said ester, methyl alcohol, acrylic acid and water, which comprises providing a column, continuously supplying the said mixture in vapor state to the lower part of the said column, continuously supplying from 1 to 25 times the weight of the said ester of water to the upper part of the said zone, continuously withdrawing at the upper part a vaporous mixture consisting of the said ester and water and continuously withdrawing at a lower point a mixture comprising the said alcohol, the said acid and water, gases containing free oxygen being excluded during the said treatment.

13. The process of producing pure esters boiling below about 200° C. of aliphatic acids containing at least one olefinic double bond from a mixture formed during the esterification and comprising such an ester, the corresponding acid, the corresponding alcohol and water, which comprises vaporizing at least the said ester and refluxing part of the vaporized material by washing the vapors with water.

WALTER REPPE.
ULRICH HOFFMANN.